(12) United States Patent
Kuberka et al.

(10) Patent No.: US 7,817,914 B2
(45) Date of Patent: Oct. 19, 2010

(54) CAMERA CONFIGURABLE FOR AUTONOMOUS OPERATION

(75) Inventors: Cheryl J. Kuberka, Penfield, NY (US); David C. Barnum, Rochester, NY (US); Frances C. Williams, Rochester, NY (US); John N. Border, Walworth, NY (US); Kenneth A. Johnson, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 753 days.

(21) Appl. No.: 11/755,203

(22) Filed: May 30, 2007

(65) Prior Publication Data

US 2008/0298796 A1    Dec. 4, 2008

(51) Int. Cl.
*G03B 17/00* (2006.01)
*G03B 17/18* (2006.01)
*G03B 7/02* (2006.01)
*H04N 5/225* (2006.01)

(52) U.S. Cl. ................ 396/263; 396/153; 396/281; 396/287; 348/169

(58) Field of Classification Search ............ 396/263, 396/52, 281, 287, 153; 348/208.1, 208.15, 348/169
See application file for complete search history.

(56) References Cited

U.S. PATENT DOCUMENTS

| | | | |
|---|---|---|---|
| 6,654,506 B1 | 11/2003 | Luo et al. | |
| 6,654,507 B2 | 11/2003 | Luo | |
| 7,046,924 B2 | 5/2006 | Miller et al. | |
| 7,164,490 B2 | 1/2007 | Manico et al. | |
| 2004/0080618 A1 | 4/2004 | Norris et al. | |
| 2005/0012830 A1 | 1/2005 | Pilu | |
| 2005/0134719 A1* | 6/2005 | Beck | 348/333.11 |
| 2005/0228849 A1 | 10/2005 | Zhang | |

FOREIGN PATENT DOCUMENTS

| | | |
|---|---|---|
| EP | 1571634 A | 9/2005 |
| GB | 2250156 A | 5/1992 |
| WO | WO2004/111971 | 12/2004 |
| WO | WO 2006040761 A | 4/2006 |

* cited by examiner

*Primary Examiner*—Rochelle-Ann J Blackman
(74) *Attorney, Agent, or Firm*—Thomas J. Strouse; Raymond L. Owens (57) ABSTRACT

The present disclosure relates to an image capture device and a technique for capturing an image. The technique includes selecting at least one subject displayed on an image capture device as an image trigger condition and entering a threshold level corresponding to the at least one image trigger condition. The technique further provides monitoring a signal from at least one sensor detecting the at least one image trigger condition and obtaining at least one digital image upon detecting the sensed image trigger condition meeting the threshold level.

24 Claims, 8 Drawing Sheets

CAMERA CONFIGURABLE FOR AUTONOMOUS OPERATION

CROSS REFERENCE TO RELATED APPLICATIONS

Reference is made to co-pending application Ser. No. 11/755,156 filed May 30, 2007 entitled "Camera Configurable for Autonomous Self-Learning Operation" to Cheryl Kuberka et al., the disclosure of which is incorporated herein by reference.

FIELD OF THE INVENTION

This invention generally relates to image capture and more particularly relates to a camera apparatus that responds to a set of environmental cues without direct operator intervention.

BACKGROUND OF THE INVENTION

In spite of advances that have made today's digital cameras easy to use and relatively trouble-free, there are still drawbacks that can impede enjoyment of the picture-taking experience. Even with the most intuitive "point-and-shoot" digital cameras, the photographer is often more involved in the task of picture taking, rather than in enjoying an event as a participant. To a large degree, this has been the accepted norm; the picture-taker has a job to do and is, therefore, somewhat less involved in the action than are other participants. Another disadvantage of this arrangement relates to the response of participants at an event, who know that their picture is being taken and may respond less than naturally during the picture-taking session.

There have been a number of solutions proposed for freeing the picture taker, allowing the photographer to get out from behind the camera and become a part of the scene. The most familiar solutions range from delay timers that enable the photographer to hustle out from behind the camera once all settings and adjustments are made, to remotely controlled shutters and other devices. While solutions such as these can provide some measure of freedom to the photographer, a significant amount of attention and setup is still required for obtaining images at an event.

Remote camera activation has been used for applications such as industrial monitoring, espionage, and building security. Sound- or motion-actuated systems for image capture enable various types of events to be recorded, such as the entry or exit of personnel, movement of a person, animal, or object, etc. Webcam devices for remote monitoring may also capture images upon sensing noise, light, sound, or motion, such as from an infrared (IR) motion detector. Cameras for such systems are typically located in fixed positions and obtain image content in a known format. Event detection camera devices are described, for example, in U.S. Patent Application Publication No. 2004/0080618 entitled "Smart Camera System" by Norris et al.

While remote camera activation for event picture-taking can utilize solutions that were developed for security and monitoring, however, there are a number of significant differences between the picture-taking environment for consumer imaging, capturing moments with family and friends, and the more mundane work of monitoring events at remote locations. Certainly, image quality, choice of subject, and timing are of key interest for consumer event photography and are relatively less important for remote monitoring. Mere camera activation with detection of movement or sound, although sufficient for remote industrial imaging, would not be likely to obtain pleasing images at a family event such as a birthday party or a holiday gathering with friends, for example.

Attempts to provide a more natural picture-taking experience include those outlined in U.S. Patent Application Publication No. 2005/0012830 entitled "Autonomous Camera Having Exchangeable Behaviors" by Pilu. The '830 Pilu disclosure describes wearable cameras having a behavior memory, where the cameras are capable of detecting events or situations of interest by analyzing data from the object field. Similarly, a group at Hewlett-Packard Corp. has proposed an "always on camera" that records continuously and is supplemented with algorithms to sort through the huge volume of images obtained in order to help select the few good ones that might be worth preserving. One version, for example, fastens to the side of a pair of eyeglasses, which makes it usable to at least some portion of the population. While it may feel natural to have a camera obtruding from the side of one's head, however, it can be questioned whether or not one is likely to elicit natural and spontaneous behavior from those in the object field, whose images are being continuously captured. Moreover, wearable solutions do not bring the photographer into the picture, but simply change how the user aims the camera. Certainly, for many types of consumer imaging situations, the idea of attaching the camera to the photographer hardly seems consonant with the idea of "freeing" the photographer.

Thus, while the value of obtaining images automatically in a more natural and spontaneous manner is acknowledged, existing solutions fall short of what is needed, on one hand, to free the photographer from the image capture function and, on the other hand, to free the subject(s) from the psychological constraint of "having one's picture taken". Existing solutions for continuous "bulk" imaging with a subsequent sorting-out process miss elements of excitement, spontaneity, and social interaction that characterize key moments that people want to capture and preserve.

Existing solutions involve the capture of either a still image or a video image when capturing a key moment. The ability to capture the entire moment including video before and after a moment as well as the still image would greatly increase context of the moment as well as increase the photographer's experience. Whereas, combined capture of video and still images has been described in International patent application WO2004/111971 A2 "Automatic Traffic Violation Monitoring and Reporting System with Combined Video and Still-Image Data" it is limited to use as evidence in traffic violations and furthermore requires the use of multiple video and still capture devices and multiple captured images. A single device capable of capturing the entire key moment that is usable by a consumer is needed to free the photographer from the image capture function.

Among problems not addressed or solved in existing solutions is the need to provide improved imaging where motion is involved. For example, it is difficult for the consumer photographer to capture an image of a soccer ball in motion, just before it is caught or missed by a goalie. For fast-moving action, consumer pictures tend to be delayed, due both to delay by the camera operator and inherent delay in the image capture timing itself, so that more interesting images can be missed, sometimes by a small fraction of a second. Subsequent editing of a video stream is one solution conventionally used to address this problem. However, it would be advantageous to have a method that allows high-speed event imaging and allows the photographer a greater degree of freedom and ease of use for obtaining an image.

Thus, it can be seen that innovative approaches are needed in order to provide a more satisfying picture-taking experience that is likely to obtain good pictures without constraining the photographer to the picture-taking task and without keeping the photographer out of the picture. For some situations, a workable autonomous camera solution should even be able to provide a workable substitute for a dedicated photographer at a group event. It would be advantageous to provide apparatus and methods for automatic or "autonomous" camera operation, well suited to the needs of the picture-taking consumer.

SUMMARY OF THE INVENTION

In general terms, the present disclosure relates to improving the versatility of digital imaging devices to include autonomous operation. With this goal in mind, the present invention provides a method of image capture including selecting at least one image trigger condition, entering a threshold level corresponding to the at least one image trigger condition, monitoring a signal from at least one sensor detecting the at least one image trigger condition, and obtaining at least one digital image upon detecting the sensed image trigger condition meeting the threshold level.

One aspect of the present invention is an apparatus for capturing an image. The apparatus includes an image capture device for selecting at least one image trigger condition and for setting a threshold level corresponding to the at least one image trigger condition, at least one sensor coupled to the image capture device for detecting the at least one image trigger condition, and a memory coupled to the image capture device for storing at least one digital image captured upon detecting the at least one image trigger condition meeting the threshold level.

Another aspect of the present invention is a method for obtaining an image capture set, composed of a still image and the previous few seconds of video, following an image capture triggered by the detection of at least one image trigger condition or the combination of the still image and the few seconds of video following the detection of the image trigger condition or combinations thereof. The method includes obtaining a video image, continuously storing at least the most current portion of the video image, responding to an instruction to obtain a still image and storing both the still image and the most current portion of the video image.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The present invention provides an autonomous image capture device, such as a camera, providing a solution that is well-suited to the needs of consumers for taking pictures of family, friends, and group events. The autonomous image capture device captures digital images automatically, in response to prompts sensed by the device, according to instructions entered by a user, training provided by the user, or environmental events detected as suitable image trigger conditions by the device. The device is flexible, allowing image capture to be triggered by, in addition to, the image capture button being pushed by the user, any of a number of programmable events. For embodiments of the present invention, it should be noted that the image captured using the image capture device can be either a video image or a still image, or some combination of video and still images.

The image capture device of the embodiments described subsequently can be a digital still camera, a video camera, or a camera that is capable of obtaining both still and video images. An image capture set is obtained by the image capture device and can contain one or more of either or both still and video images captured by the device, based on the capabilities of the device and on the setup parameters specified by the operator or by device control logic. In one embodiment, the image capture set is composed of the combination of a still image and a predetermined number of seconds of video preceding the detection of the image trigger condition, the combination of the still image and the predetermined number of seconds of video following the detection of the image trigger condition, and/or combinations thereof.

Figure 1:
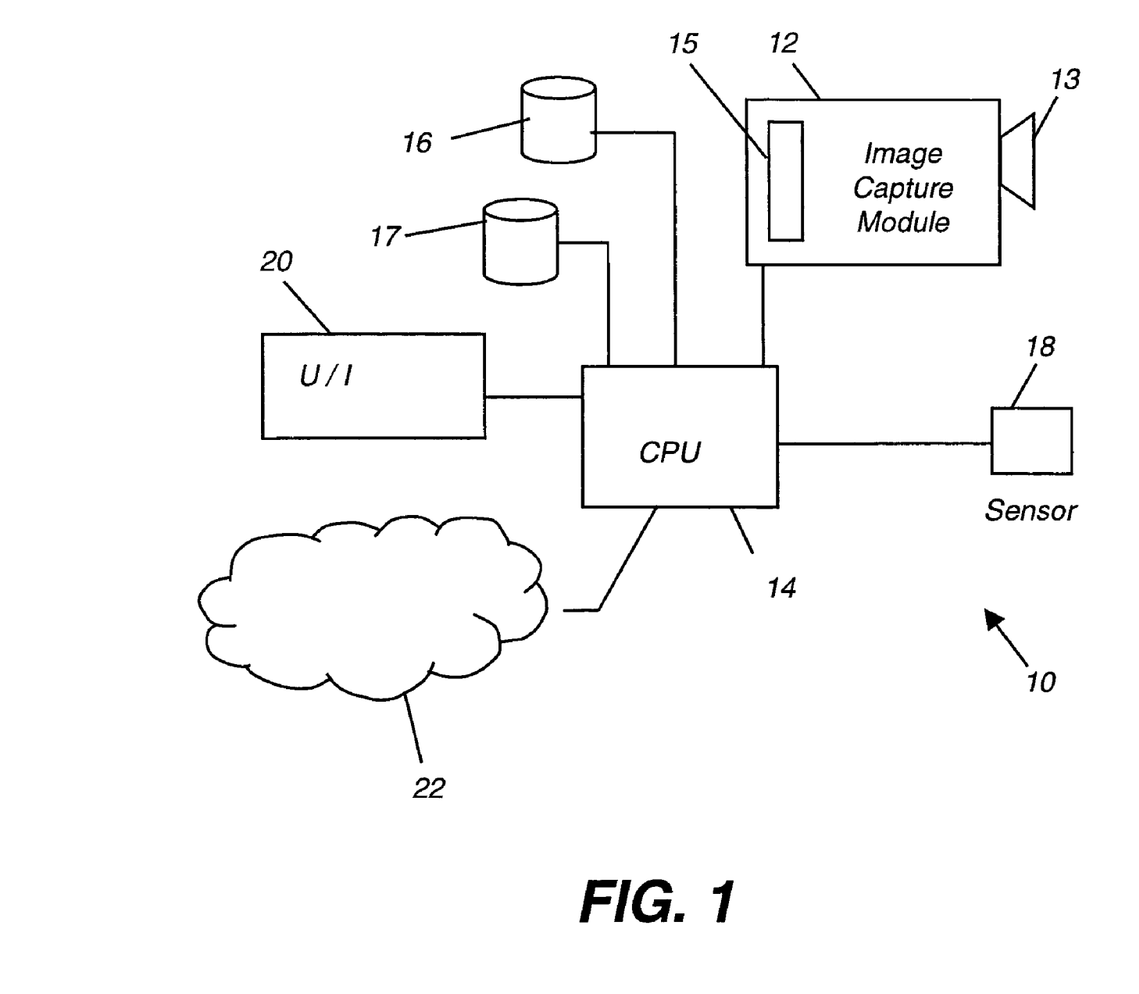
FIG. 1 is a schematic block diagram of a digital image capture device according to an embodiment of the present invention.

FIG. 1 is a schematic block diagram of a digital image capture device 10 according to an embodiment of the present invention. An image capture module 12 containing at least a lens 13 and an image sensor 15 connects to a central processing unit 14 that executes a logic program for automatically obtaining pictures. At least one sensor 18 is in communication with the central processing unit 14, enabling the central processing unit 14 to respond to a sensed condition by activating image capture module 12 to capture an image. Image data of the captured image can be stored locally at optional storage 16 or can be transmitted to remote storage over network 22, such as an Ethernet network or other network type. A user interface 20 enables operator instructions to be entered and acted upon by the central processing unit 14, allowing flexible operation and response of image capture device 10.

As would be apparent to one skilled in the image capture arts, the basic arrangement of FIG. 1 allows a number of different embodiments. For example, digital image capture device 10 can have sensor 18 integrally built-in, along with any of the central processing unit 14, user interface 20, or storage 16. One or more environmental sensors 18 can be provided, including sensors that detect sound, light (visible, ultraviolet or infrared), vibration, heat, electric fields, magnetic fields, radiation and other environmental variables that can act as cues or prompts, as will be described subsequently. Central processing unit 14 can alternately be an on-board microprocessor or a separate personal computer, such as a laptop computer or workstation, for example. User interface 20 can be built-in or can be separable from apparatus 10. The central processing unit 14 and storage 16 components can be located remotely, at some other location along network 22. Connections between components can be wireless or wired, depending on the flexibility needed. Therefore, for the purpose of subsequent description, the arrangement of FIG. 1 can serve as a useful model, subject to any number of variants.

Figure 2:
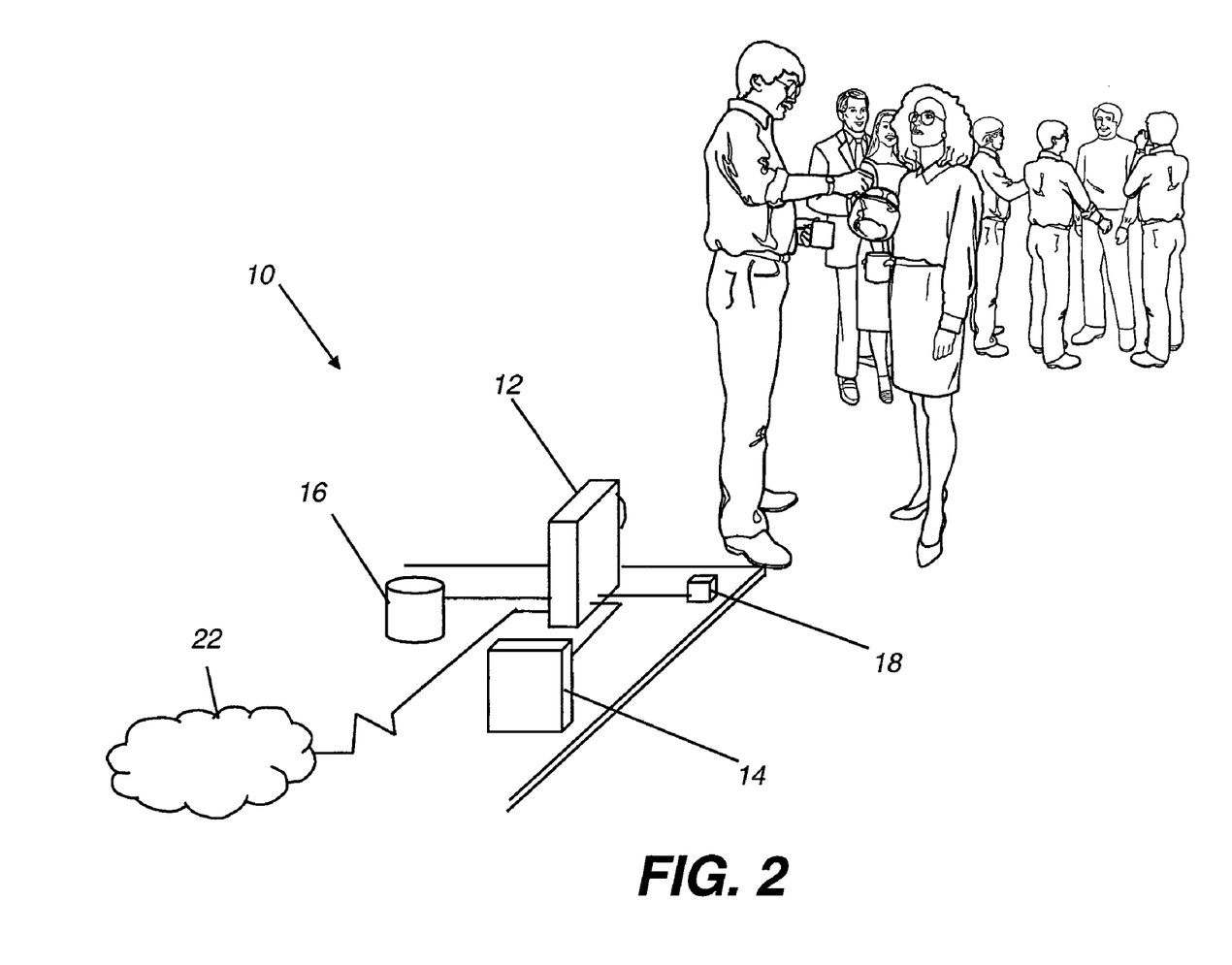
FIG. 2 is a block diagram illustrating a digital image capture device used at an event according to the present invention.

FIG. 2 is a block diagram illustrating a digital image capture device 10 used at an event according to the present invention. Digital image capture device 10 is positioned at a convenient location for image capture, such as on a shelf or high table for an indoor event, for example. Alternately, the digital image capture device 10 could be handheld or attached to the body or other method wherein the digital image capture device 10 is vaguely pointed in the direction where an image capture is desired. One or more sensors 18 can be built into digital image capture device 10 or located at any suitable distance from digital image capture device 10, as permitted by the interconnecting communication channel between them. This interconnecting communication channel can be wired or wireless. One or more of sensors 18 could be concealed, disguised as or in an object in the scene, or worn by someone who is in the vicinity of the scene or of digital image capture device 10.

Sensor Types and Arrangements

Sensor 18 can be any of a number of types of sensor device and can detect any of a number of conditions, particularly using the processing capabilities of the central processing unit 14. Multiple sensors 18 can be used. Sensor 18 can be, for example, an audio sensor. In one embodiment, noise above a predetermined threshold level can indicate a suitable time for image capture. However, there can be subtler cues that are appropriate for image capture. A type of sound can also indicate a time that is advantageous for image capture. This can include a cue from one or more participants, such as a key word, a sound obtained from a type of prompt device, whether or not audible to the human ear, the sound of laughter, a sudden transition in volume, either from high to lower or from low to higher, applause, transition to silence, etc. A voice profile of one or more participants can also be obtained and the central processing unit 14 programmed to respond to the voice of any particular person or to intonations in sound from one or more persons. Also, sound from animals or objects, such as a bell, can trigger image capture.

Alternately, sensor 18 can be any type of environmental sensor such as a type of heat sensor or infrared sensor. Heat detected from event participants can be used to initiate image capture. Changes in a detected heat profile for the image field can also be used, such as changes that indicate motion. Sensor 18 could also sense changes in light, including brightness or spectral changes. Spectral changes could be sensed beyond the visible spectrum into the ultraviolet region or the infrared region by sensor 18. This type of change could be used, for example, to indicate movement suitable for initiating image capture. Vibration or airflow could alternately be sensed by sensor 18 or by multiple sensors 18. Electric fields, magnetic fields or radiation could be sensed by sensor 18 as well to sense changes in the image field that initiate image capture. These factors can indicate proximity of one or more participants, for example.

In other embodiments, the role of sensor 18 can be performed by image processing software that executes on image data that is continuously obtained by image capture module 12. By continually monitoring the video signal that is obtained by image capture module 12, this software can detect events such as sudden motion, motion starting or motion stopping, change in brightness, and other conditions that can serve as image trigger conditions to initiate image capture.

Capturing Content

In another operating mode of digital image capture device 10, an image capture set is obtained. The image capture set is composed of the combination of a still image and a predetermined number of seconds of video prior to the detection of the image trigger condition, the combination of the still image and a predetermined number of seconds of video following the detection of the image trigger condition, or combinations thereof. In this embodiment, image capture module 12 can capture both still images and a series of images as in video or alternately the video can be captured from the preview stream provided to the display.

One problem noted earlier, relates to the response time of a camera operator. In this operating mode, temporary buffer 17 is used as a temporary buffer, to store the most current portion of the video image that is continuously being obtained by image capture module 12. The resolution of the video is lower than the resolution of the still image to enable fast frame rate video, to reduce the data rate of the video stream and also to reduce the required size of the temporary buffer 17. This provides a method for obtaining video images from a few seconds prior to detection of the image trigger condition to show the events leading up to the still image capture. In addition, this few seconds of video can provide context to the still image capture when in an image capture set.

Figure 3:
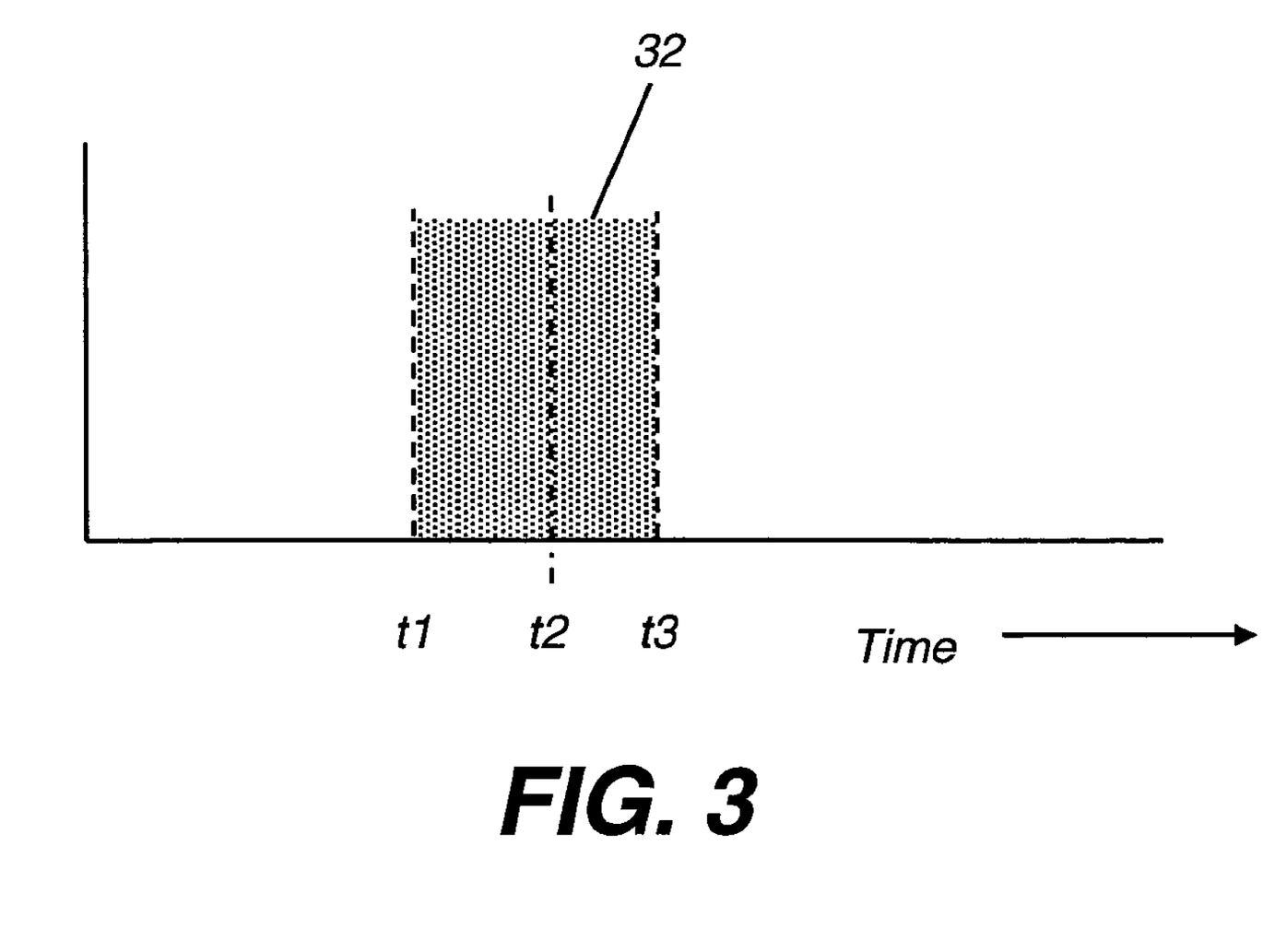
FIG. 3 is a timing diagram for an image capture set obtained according to the present invention.

FIG. 3 is a simplified timing diagram that shows how an image capture set can be obtained according to the present invention. In FIG. 3, window 32 illustrates a time window 32. In time window 32, time t1 is a predetermined period of time earlier than t2 for which the video data can be stored in the temporary buffer 17. For example, time t1 could be 10 seconds prior to time t2. Time t3 is a predetermined period of time after t2 for which the video data can be stored in the temporary buffer 17. For example, time t3 could be 5 seconds after t2. The trigger event occurs at time t2, as shown in the diagram of FIG. 3. Since time t3 is a period of time later than t2, the video data from the period t2 to t3 can be stored directly in storage 16. The image capture set can be composed of any combination of the video image from time t1 to t2, the still image captured at t2, and the video image from t2 to t3 as discussed in more detail below. Following capture of the image capture set, the image capture set is moved into storage 16.

In one embodiment, video taken for a predetermined period of time preceding the still image capture can be included in an image capture set. This period of time is illustrated by window 32 in FIG. 3 as the times between t1 and t2. For this period, the video is continuously being stored in temporary buffer 17 (FIG. 1). In addition, video from a predetermined period of time following the still image capture, shown in FIG. 3 as time t2 to time t3, can also be included in the image capture set. The time between t1 and t2 and the time between t2 and t3 are established by: user preference, temporary buffer 17 size, a default setting or a combination thereof. The video is continuously stored in temporary buffer 17 when the device is ready to capture, such as when the digital capture device 10 is placed in a mode in which image capture sets are enabled when the digital capture device 10 is picked up by the user, or when the user contacts the image capture button.

User Interface Example

Figure 4:
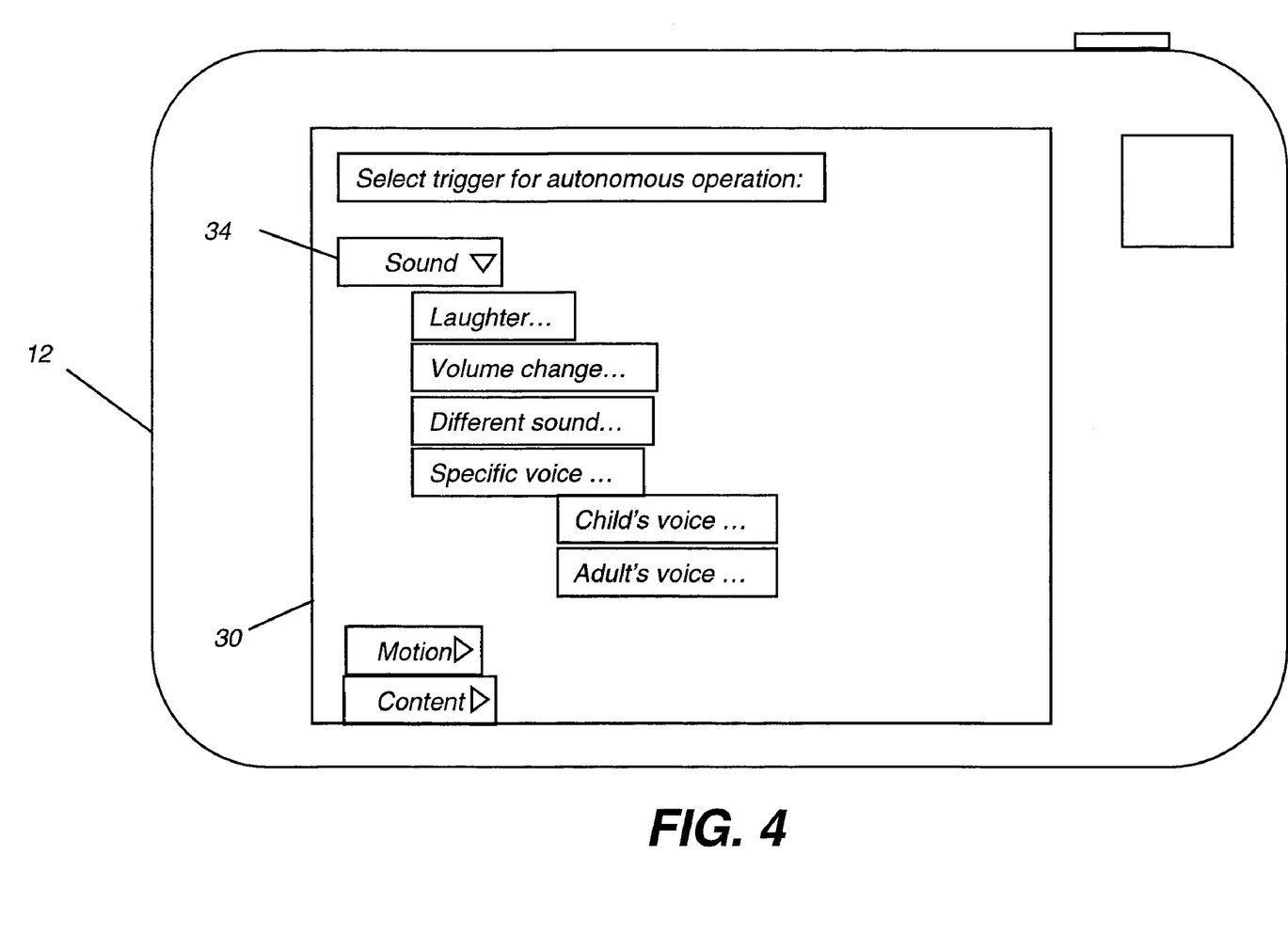
FIG. 4 illustrates one example of an interface screen for setup of the imaging system according to one embodiment of the present invention.

FIG. 4 illustrates one example of an interface screen 30 for setup of the imaging system according to one embodiment of the present invention. In one embodiment, the image capture system is programmed to respond to subtle cues in the event environment. For example, laughter can have particular audio signal characteristics that can be quantified and used to initiate image capture. Some amount of training can also be used, by which the central processing unit 14 is programmed to achieve better and better results for distinguishing between one type of sound and another (or, more generally, one type of sensed condition and another).

Figure 5:
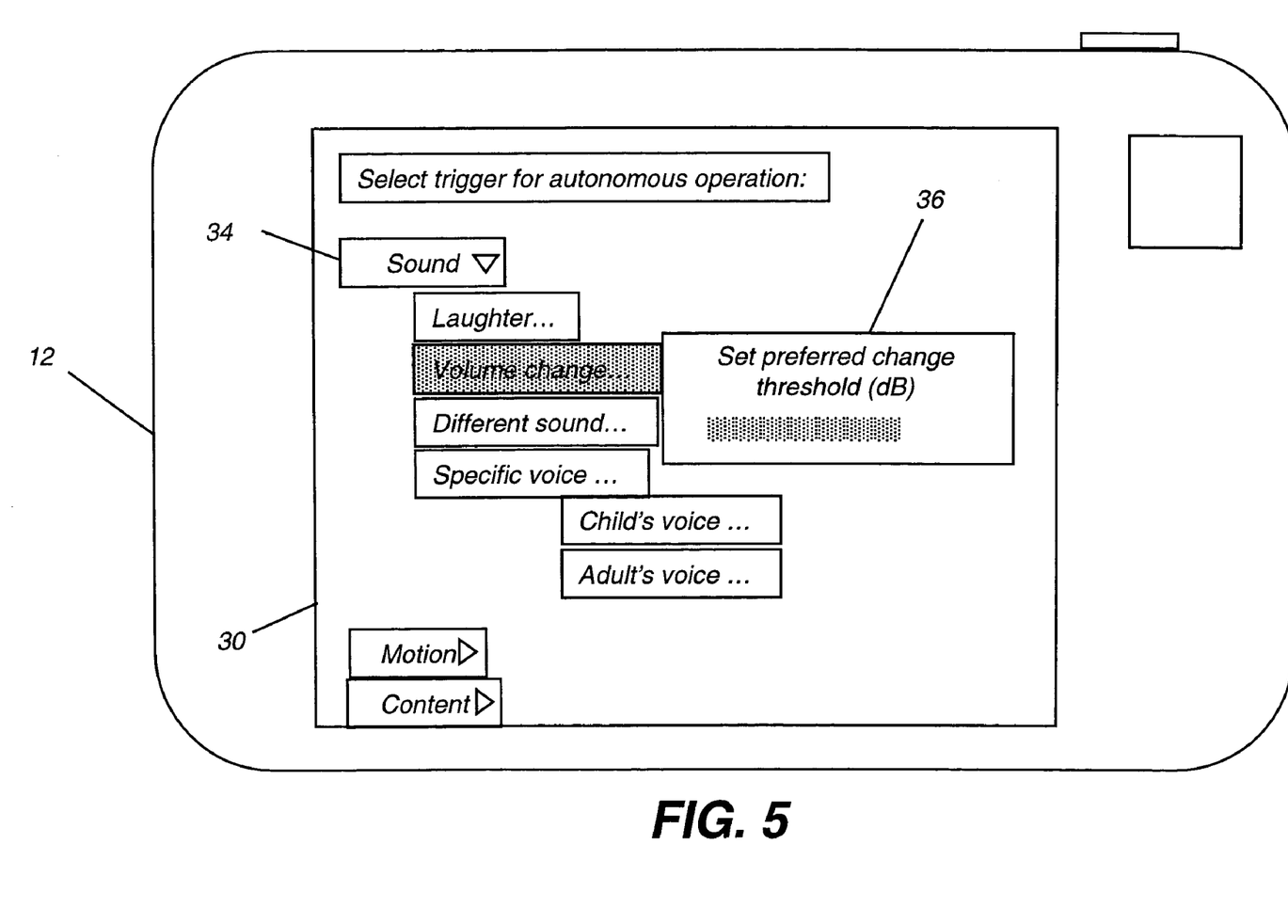
FIG. 5 is a plan view of the user interface screen used for image trigger setup.

In FIG. 4, interface screen 30 appears on the camera display and uses touchscreen menu selections. Expandable menu selections 34 are provided to enable selection of basic cues or prompts for autonomous image capture. In the example of FIG. 5, a volume change condition is selected as a prompt to initiate image capture. The camera operator makes a setting 36 for a volume change threshold that will cause an image or an image capture set to be obtained. A control knob on the camera can be re-mapped in order to set the setting level. Optionally, a touchscreen or other type of operator input mechanism can be used to obtain a preferred setting level.

Transitions can be effectively used as image capture triggers and can be more useful than static conditions. For example, digital image capture device 10 could be set up to obtain images when noise above a certain threshold is sensed. However, in a relatively noisy environment, this could cause digital image capture device 10 to activate and capture images more often than is desired. Instead, transitions between noise levels, of a certain number of dB within a given time interval, for example, would be more likely to initiate image capture during an event that interests the camera user.

Other prompt selections can be more complex than shown in the simple example of FIG. 5. For example, prompt selection can specify a type of voice (Adult or Child, for example) or can specify a particular person's voice. Voice recognition software running on the central processing unit 14 (FIG. 1) would be used to detect the voice of one or more individuals as a cue, as described subsequently in a more detailed example.

Still other selectable events that could be used as image capture triggers including but are not limited to: changes in color, brightness, or other image characteristics. Motion can be detected by a number of characteristics, including sudden motion, stopped motion, motion above or below a specified threshold speed, or having other characteristics that can be programmable selected. Content can also be used as an image capture trigger, so that various image subjects can be detected and act as image capture triggers. For example, variables such as a number of faces in the image field could serve as image capture triggers; changes in complexion or color, such as those that might indicate exertion or blushing, might also be sensed by digital image capture device 10 and used as image trigger conditions for image capture.

Still other defined content conditions can include detection of a person, animal, face, or other distinguishable subject or object. Digital image capture device 10 can be provided with logic tools for periodically analyzing images and determining if the image is that of a person, pet or other animal, or object of interest. Digital image capture device 10 can also have the capability to "learn" specific people or objects, as described subsequently.

A number of optional sensors could be employed to detect conditions other than those normally associated with light or sound. Infrared detectors could be selected to identify certain people, pets, or situations where body heat or other changes in the measured heat profile in the field of view are suitable image capture triggers. Sensors for body temperature, EKG, vibration, or other detectable parameters could be used.

As noted earlier, both still and video images can be obtained as part of an image capture set. The operator interface for digital image capture device 10 can offer the operator an option to set up image trigger conditions specifically for either type of image capture or for capture of both types in some combination.

Example Using Specified Voice or Other Audio Signal

Figure 6:
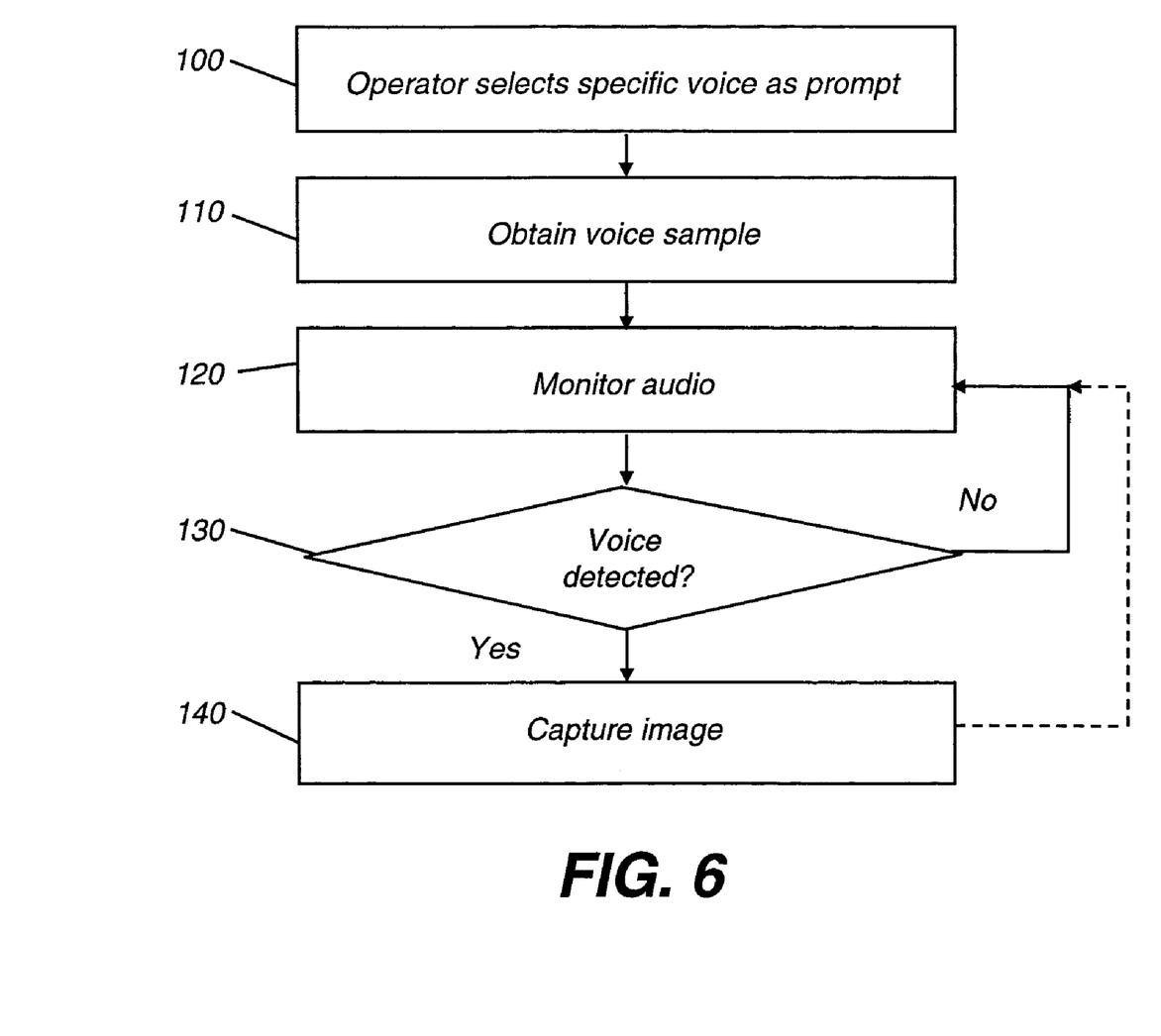
FIG. 6 is a logic flow diagram that shows steps used for automatic triggering of image capture.

FIG. 6 is a flow chart illustrating voice and/or audio detection logic according to the present invention. For voice or other audio detection, the logic flow of FIG. 6 or similar logic can be used. The following example and steps are given for a voice example. It should be noted that any type of sound, such as that of a particular pet, musical instrument, door opening, phone, bell, or other sound could be a similar stimulus for image capture with digital image capture device 10 in autonomous image capture mode.

In a selection step 100, the operator specifies voice or sound recognition for one or more voices (or other sounds) using interface screen 30 commands. In a sample acquisition step 110, the operator has the identified person or persons speaking into a microphone. The microphone can be on the camera itself, or attached to the camera or to the central processing unit 14. Depending on the sophistication required, voice sampling can be relatively simple, merely requiring the speaker to talk for a period of a few seconds, long enough for a basic audio profile to be generated. In a more complex setting, the identified person can be required to say specific phrases that help to characterize tone and speech patterns of a particular person so that they can be distinguished from those of others.

A monitor step 120 is executed once the camera is activated for autonomous operation. During monitor step 120, the central processing unit 14 on digital image capture device 10 continually monitors the audio stream detected from a microphone input signal. An event detection looping step 130 occurs periodically, as control logic determines whether or not the voice(s) of the specified person(s) has been detected. If so, an image capture step 140 is executed. Imaging can then be stopped until the next operator command is received. Optionally, continuous image capture can be initiated with each detected audio "event" indicating that the specified person(s) or participants have spoken.

Automatic Response to Environmental Variables

Figure 7:
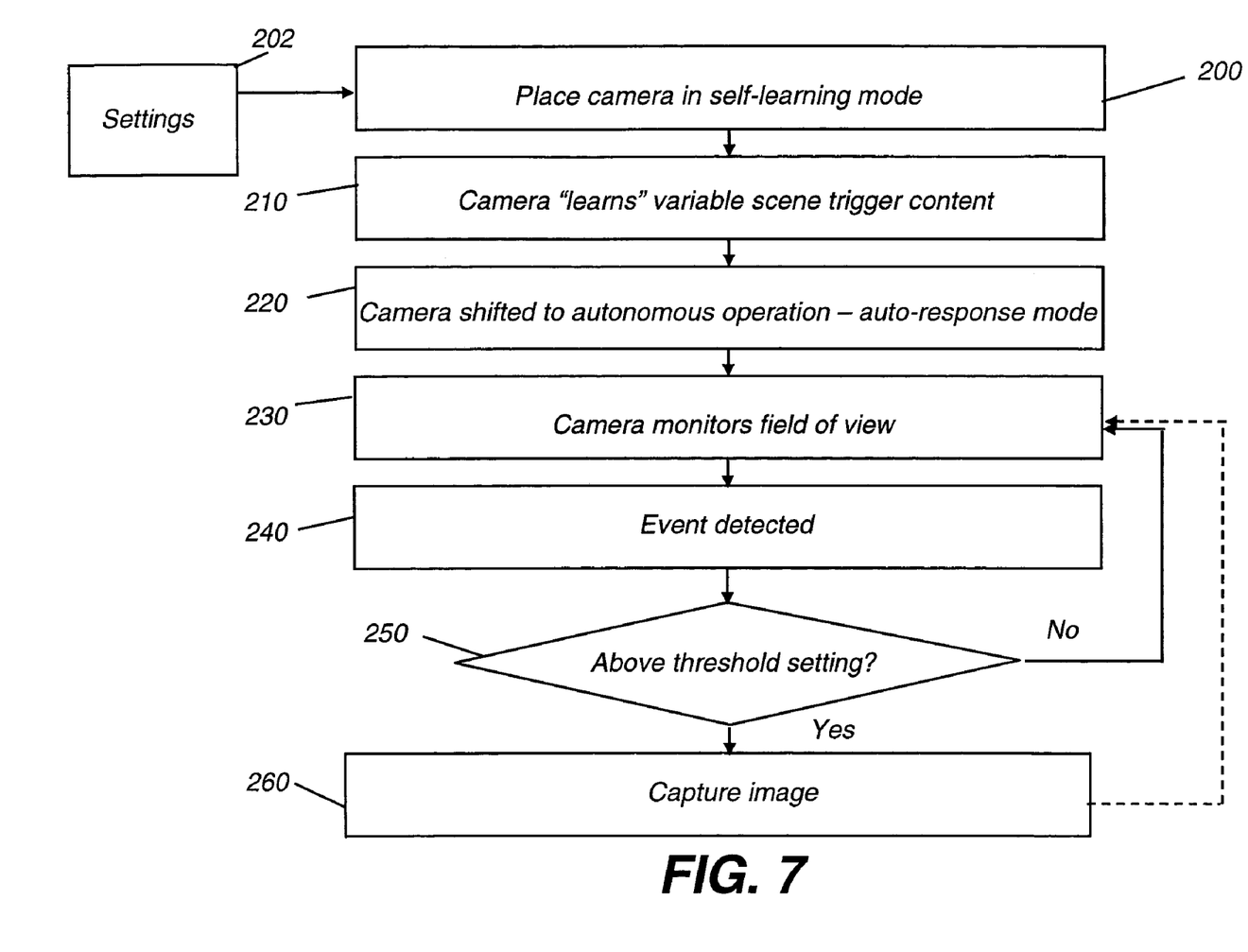
FIG. 7 illustrates how an automatic response mode works according to one embodiment of the present invention.

FIG. 7 illustrates how an automatic response mode works according to one embodiment of the present invention. A digital image capture device 10 can be put into an automatic response mode, in which it responds to changes in an "expected" or "normal" setting. In this mode, digital image capture device 10 can adapt to changes in its field of view and capture images when it detects a sufficient amount of change in its environment. In this way, for example, digital image capture device 10 can be left by itself in a room that is initially empty. As a person enters, the detected activity can be of sufficient energy to activate digital image capture device 10 for image capture.

In FIG. 7, a mode initialization step 200 is first carried out, during which the digital image capture device 10 is placed in a mode for adapting to its particular field of view. One or more sets of preset threshold settings 202 can be provided to help set sensitivity thresholds for "energy levels" at which digital image capture device 10 performs image capture. A self-learning step 210 for training the digital image capture device 10 to learn about the scene in order to develop image trigger condition thresholds follows. During step 210, digital image capture device 10 senses one or more variables from its environment. These variables can include, for example, activity in its field of view, ambient noise level, relative brightness, color, and other detectable cues. While in this mode, digital image capture device 10 integrates this sensed activity over time, so that it obtains a characteristic "profile" of what its "world" looks like. Digital image capture device 10 will then be able to respond to transitions in the scene once it has sensed the relative activity or energy level in the scene over time. After some learning time period, digital image capture device 10 is then ready for an autonomous operation step 220. This can be after a preset time period, for example. Alternately, some instruction from the operator can be used to end self-learning step 210 and to begin autonomous operation step 220.

A monitoring step 230 is executed as part of autonomous operation step 220. During monitoring step 230, digital image capture device 10 monitors its field of view and its selected set of environmental variables. An event detection step 240 occurs when some measured variable exceeds a given threshold value. For example, noise of a passing car outside can be detectable, but below the threshold value that has been "learned" by digital image capture device 10. This can occur where digital image capture device 10 has been placed in a relatively noisy environment, so that false triggering from expected environment noise is not used to trigger image capture. A decision step 250 is executed when a stimulus of some type has been sensed. If the sensed signal exceeds a given threshold value or meets other necessary conditions that can be influenced both by preset settings 202 and by learned characteristics obtained in self-learning step 210, an image capture step 260 can be initiated. This can terminate autonomous operation, or can simply cause the control logic to loop back to monitoring step 230 as shown.

As yet another part of autonomous operation step 220, digital image capture device 10 can also continually "re-learn" its environment based on what is sensed while in operation. For example, a meeting room can initially be empty during self-learning step 210. As participants begin to enter the room, digital image capture device 10 will begin to obtain images, advancing to image capture step 260 as just described. For example, an image will be captured for each new person entering the room or periodically. However, once the room is full or no one else will enter, the camera's response should change accordingly. In another embodiment, by continuing to integrate sensed data, digital image capture device 10 can thus obtain a history that is updated, so that its sensitivity threshold changes once a meeting has begun. A type of redefined, recalculated or "rolling" normal state would then be used, allowing digital image capture device 10 to adjust its threshold sensitivity in response to a changing environment or new conditions, using recent "history" of sensed conditions. With respect to the logic shown in FIG. 7, self-learning step 210 can thus be invoked periodically in order to adjust the threshold setting used in decision step 250. By obtaining this history, only a dramatic change in volume or motion might then trigger subsequent image capture. False triggering could be effectively prevented to minimize the capture of uninteresting or repetitive images.

It should also be observed that digital image capture device 10 can automatically enter automatic response mode, carrying out mode initialization step 200 immediately upon power-up or according to a timer. Additionally, monitoring step 230 can have different levels of sensitivity that change with time. This feature would allow digital image capture device 10 to enter a "power save" mode, reducing battery or other power consumption if there are no detected events within a predetermined time period. For example, where a user neglects to turn the digital image capture device 10 off and the device is kept in a meeting room over the weekend, a lower level of monitoring sensitivity can be most appropriate for a power save feature.

Overall, a various configurations are available to the operator of digital image capture device 10 for use in an automatic response mode. In one embodiment, no configuration of the camera is needed. The camera automatically enters the automatic response mode as soon as power is applied unless otherwise instructed by the operator. Alternately, configuration tools can be provided to select from various sensed conditions or to provide initialization thresholds.

As noted earlier, the image capture set that is obtained in automatic response mode can be still images or video images or some combination of both image types. A short video sequence can be obtained in image capture step 260 under certain conditions, such as for some types of events or for different threshold settings.

Learned Response to Subjects or Events

Figure 8:
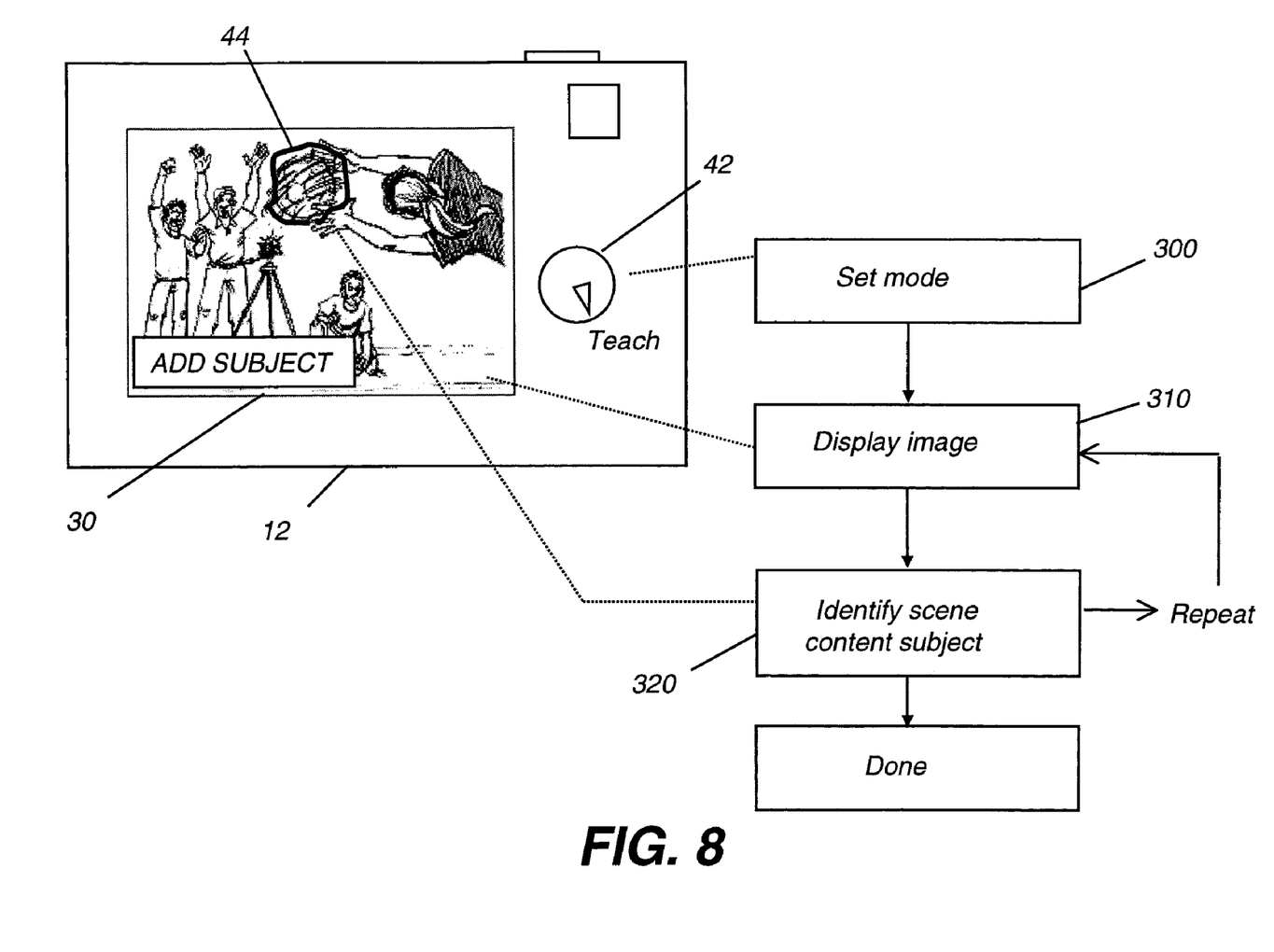
FIG. 8 illustrates a procedure an operator will follow for training the camera to use various image subjects as image capture triggers.

FIG. 8 illustrates a procedure for teaching the digital image capture device 10 to use various identifiable portions of an image as subjects of interest that act as image capture triggers. In one embodiment, the digital image capture device 10 continuously analyzes a field of view and when a subject of interest is detected, image capture is initiated. As such, the subject of interest represents the variable to be detected and the presence of the subject of interest within the field of view indicates that the image trigger condition threshold level has been exceeded. Alternately, the image trigger condition can be a change in the presence of the subject of interest wherein the threshold is exceeded when the subject of interest leaves the field of view.

The digital image capture device 10 learns or is trained to respond to specific subjects of interest or specific types of events that can be sensed or that occur within its field of view. In one embodiment, as shown in the example of FIG. 8, the operator follows a procedure for educating or training the camera to use various subjects of interest as image capture triggers. More specifically, in a setup step 300, the operator instructs digital image capture device 10 to enter a teach mode. This instruction can be entered using a control 42 on the camera or by some other command entry device provided for this purpose, such as a pull-down menu or specified control sequence.

In a display step 310, an image containing the subject or event of interest appears on camera display 30. This can be a newly captured image or a previously stored image that is accessible to the camera. With the image displayed, an identification step 320 is next performed. In identification step 320, the operator explicitly indicates the subject of interest that should be used as an image capture trigger. In the example of FIG. 8, the operator would like an image captured when digital image capture device 10 has a soccer ball in its field of view. The operator displays an appropriate image with that subject of interest and then highlights the subject of interest in some way such as with a touchscreen. However, the invention is not limited to highlighting, and any suitably technique to select a subject can be used, such as those techniques described in U.S. Pat. No. 7,164,490 "Custom Cut Image Products" issued to Manico et al. The displayed image can be an image previously captured and stored in digital image capture device 10, or an image that is accessible to digital image capture device 10, such as through a network 22. Optionally, the displayed image could be simply the live image display that is continuously obtained during digital image capture device 10 operation.

In FIG. 8, an outline 44 is drawn around the soccer ball shown in the camera display 30. Outline 44 could be sketched on a touchscreen display or could be generated in some other way. Optionally, a finger press on a touchscreen can identify the subject of interest. Image analysis software on the central processing unit 14 (FIG. 1) would then be able to bound and identify the object nearest the finger press.

The setup steps for teaching digital image capture device 10 shown in FIG. 8 can be repeated as many times as is necessary in order to generate a "library" of subjects of interest. This same sequence could be used, for example to introduce people as subjects of interest to the digital image capture device 10. This would allow digital image capture device 10 to identify it's people "of interest" and to work on obtaining images of this set of people. A library of subjects of interest could then include both objects, such as the soccer ball of the example of FIG. 8, and any number of people.

A similar sequence could be used to identify particular colors or sounds and store these similarly in the library of learned response subjects and events. In this way, the soccer team uniform or team cheer could be stored as image trigger conditions, for example.

Part of the teaching sequence can require feedback and correction of camera errors in obtaining images of people or objects that are similar, but not the preferred choices. For example, a mother could effectively teach digital image capture device 10 to distinguish her child from other children on the team or in the school play.

By combining multiple subjects of interest, the user can teach the digital image capture device 10 to capture images when the subjects of interest are all present in an image together. An example of using multiple subjects of interest would be to teach the digital image capture device 10 to initiate an image capture when a soccer player with a specific jersey number is in the field of view along with the soccer ball and the soccer goal. In this case, the jersey number, the soccer ball and the soccer goal would each be identified as subjects of interest and the image trigger condition threshold would be the simultaneous presence of all 3 subjects of interest in the field of view.

In another embodiment, digital image capture device 10 can be configured to use a library of images to determine the preferred subjects of interest that a particular user tends to have based on the content of the library. This library of images may be located on the digital image capture device 10 or be located at a remote site that is accessed via the network 22. For example, repeated images of a certain child, pet, or other subject would indicate that this particular subject is of significant value to the user. Image analysis software can be used to track the number of images obtained of various subjects and use this data as input to a learning process to determine the preferred subjects of interest. Similarly, digital image capture device 10 can assign an image value to each image in a library of images according to its perceived value to the user. This has been termed an Image Value Index (IVI). For example, data can be obtained on how long a user looked at certain images and the content of those images. Areas of importance in an image can be detected in a number of ways, such as that described in commonly assigned U.S. Pat. No. 7,046,924 entitled "Method and Computer Program Product for Determining an Area of Importance in an Image using Eye Monitoring Information" issued to Miller et al. Other useful indicators of the effective value of various image content can include the number of email transactions using an image and identifiable content for images captured from this device. Metadata provided with images transferred and detected by digital image capture device 10 can also be scanned and used to indicate subjects that appear to be of particular interest to a user.

Once one or more subjects of interest have been stored, digital image capture device 10 can employ these subjects of interest as image capture triggers whenever it is placed in automatic response mode. These image capture triggers can then be sensed as "instructions" to digital image capture device 10 to capture an image (or capture an image capture set) when the subject or subjects of interest are present in the field of view and a corresponding threshold has been satisfied. Additional user procedures are provided for managing the library of subjects of interest and other learned image capture triggers, eliminating image capture triggers that no longer have value to the user, prioritizing image capture triggers, or coordinating the use of multiple image capture triggers in combination.

Image Processing

Conventional photography approaches often required considerable care and attention to the exact setup of the camera device and supporting lighting components, in order to optimize image quality as much as possible. In contrast, the present invention takes advantage of various benefits of digital imaging for automating the image processing that is needed in order to obtain pleasing images when using digital image capture device 10.

In one embodiment, a wide-angle camera is used for obtaining the original digital image. Then, this original image is centered and cropped using any of a number of well-known techniques for identifying the significant image content from an image and cropping to remove content of less interest for forming a conditioned digital image. It can be observed that ongoing and anticipated future improvements in imaging resolution would enable a cropped image to have a pleasing appearance and very good image quality.

Key frame extraction methods can be used in order to detect and distinguish key image frames that are most likely to be of value to the user. Key frame extraction methods are described, for example, in commonly assigned pending U.S. patent application Ser. No. 11/346,708, filed Feb. 3, 2006 entitled "Extracting Key Frame Candidates from Video Clip" to Luo et al., and pending U.S. patent application Ser. No. 11/347,679, filed Feb. 3, 2006 entitled "Analyzing Camera Captured Video for Key Frames." to Luo et al. Other key frame extraction methods are described in U.S. Patent Application No. 2005/0228849 entitled "Intelligent Key Frame Extraction From a Video" by Zhang.

Automatic zoom and crop techniques are also of value for selecting that portion of a wide-field image that is of particular interest. Examples of patents that describe automatic zoom and crop techniques that could be used include commonly assigned U.S. Pat. No. 6,654,507 entitled "Automatically Producing an Image of a Portion of a Photographic Image" to Luo and commonly assigned U.S. Pat. No. 6,654,506 entitled "Method for Automatically Creating Cropped and Zoomed Versions of Photographic Images" to Luo et al. The video in the image capture set can be used to further improve the automatic zoom and crop process as applied to the content of the still image of the image capture set. Also, the image capture trigger information can be used to further improve the image content of the automatically zoomed and cropped images by providing input to the automatic zoom and crop process.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the invention could be used with a number of types of digital camera, by making the appropriate connections between components and using control program logic that executes on a standard workstation or laptop computer platform. Or, the apparatus of the present invention could be packaged as a product, with sensor, control logic, interface, and other functions integral to the device. Various types of image processing could be employed, depending on the application. Multiple cameras could be used, at different locations, and obtaining images based on the same sensed condition. Different arrangements of sensors could be used, with different behavior programmed based on various combinations of conditions sensed.

Thus, what is provided is an apparatus and method for providing a camera apparatus that responds to a set of environmental cues to obtain an image capture set without direct operator intervention.

PARTS LIST 10 digital image capture device
12 image capture module
13 lens
14 processing unit
15 image sensor
16 storage
17 temporary buffer
18 sensor
20 user interface
22 network
30 screen
32 window
34 menu selections
36 setting
42 control
44 outline
100 selection step
110 sample acquisition step
120 monitor step
130 event detection looping step
140 image capture step
200 mode initialization step
202 threshold settings
210 self-learning step
220 autonomous operation step
230 monitoring step
240 event detection step
250 decision step
260 image capture step
300 setup step
310 display step
320 identification step

The invention claimed is:

1. A method of automatically capturing an image with an image capture device comprising:
   selecting an automatic image trigger condition;
   entering a threshold level corresponding to the automatic image trigger condition, wherein reaching the threshold level of the automatic trigger condition indicates that a suitable image can be captured;
   monitoring of a signal for detecting the automatic image trigger condition; and
   automatically operating the image capture device to capture at least one digital image upon the automatic detection of the automatic image trigger condition meeting the threshold level.

2. The method of claim 1, wherein selecting the automatic image trigger condition further comprises selecting the presence of predetermined image content in the field of view of the image capture device.

3. The method of claim 2, wherein selecting the presence of predetermined image content comprises selecting the predetermined image content from a portion of an image previously captured and stored in the image capture device.

4. The method of claim 3, wherein selecting the predetermined image content from a portion of an image previously captured and stored in the image capture device further comprises indicating the predetermined image content by using a touchscreen.

5. The method of claim 3, wherein selecting the predetermined image content from a portion of an image previously captured and stored in the image captured device further comprises outlining the predetermined image content from a group consisting of an object, animal and person from the previously captured and stored image displayed on the image capture device.

6. The method of claim 2, wherein selecting the predetermined image content further comprises selecting the predetermined image content from a portion of digital image that is accessible to the image capture device.

7. The method of claim 6 further comprising accessing the digital images via a network.

8. The method of claim 2 further comprising analyzing an image collection to select the predetermined image content.

9. The method of claim 8, wherein analyzing the image collection to select the predetermined image content further comprises analyzing image metadata.

10. The method of claim 8, wherein analyzing the image collection to select the predetermined image content further comprises using an Image Value Index.

11. The method of claim 8, wherein analyzing the image collection to select the predetermined image content further comprises analyzing the image content.

12. The method of claim 1 further comprising:
    detecting a region of interest in the obtained at least one digital image; and
    cropping the at least one digital image automatically according to the region of interest in the image, and forming a conditioned digital image.

13. The method of claim 1, wherein selecting the at least one automatic image trigger further comprises selecting the automatic image trigger from the group consisting of laughter, applause, transition in volume level over a predefined threshold, a spoken term or phrase, a sound made by a prompt device, a certain person's voice, presence of a preferred subject in the field of view of the image capture device, a change in temperature, a change in vibration, a change in spectrum, a change in infrared, a change in ultraviolet, a change in electric field, a change in magnetic field, a change in radiation, and a change in air flow.

14. The method of claim 1, wherein the step of monitoring a signal further comprises using a sensor to produce a signal and monitoring the signal from the sensor, wherein the sensor is selected from the group consisting of an audio sensor, a heat sensor, a vibration sensor, a spectral sensor, an ultraviolet sensor, an infrared sensor, an electric field sensor, a magnetic field sensor, a radiation sensor, an air flow sensor, a motion sensor or an image sensor.

15. The method of claim 1, wherein obtaining the at least one digital image further comprises obtaining an image capture set having both at least one still image and a predetermined number of seconds of video preceeding the detection of the automatic image trigger condition.

16. A method of claim 15, wherein obtaining an image capture set further comprises obtaining a combination of at least one still image, a predetermined number of seconds of video preceding the detection of the automatic image trigger condition and a predetermined number of seconds of video following the detection of the automatic image trigger condition.

17. The method of claim 15, wherein the still image is automatically cropped using information from the video.

18. The method of claim 15, wherein the still image is automatically cropped using information from the automatic image trigger condition.

19. The method of claim 1, wherein the step of monitoring the signal is provided by analyzing images from an image sensor.

20. The method of claim 19 further comprising detecting motion using the image sensor.

21. The method of claim 1, wherein monitoring the signal further comprises detecting changes in light level in excess of a predetermined threshold value.

22. The method of claim 1, wherein selecting the automatic image trigger condition further comprises selecting more than one automatic image trigger condition, with corresponding thresholds and obtaining at least one digital image upon detecting that all of the more than one automatic image trigger conditions thresholds have been met.

23. The method of claim 1, wherein selecting the automatic image trigger condition comprises accepting predetermined default conditions for the image capture device.

24. The method of claim 1, wherein the automatic image trigger condition for obtaining the at least one digital image further comprises detecting motion starting or motion stopping in the field of view of the image capture device.

* * * * *